Sept. 16, 1969  H. KROEMER  3,467,896
HETEROJUNCTIONS AND DOMAIN CONTROL IN BULK
NEGATIVE CONDUCTIVITY SEMICONDUCTORS
Filed March 28, 1966  3 Sheets-Sheet 2
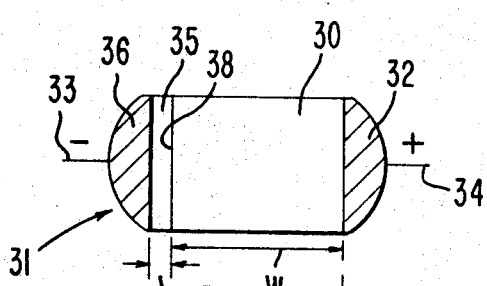
FIG. 6
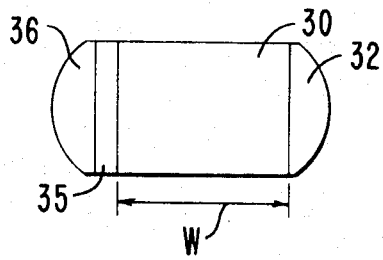
FIG. 8A
FIG. 8B
FIG. 8C
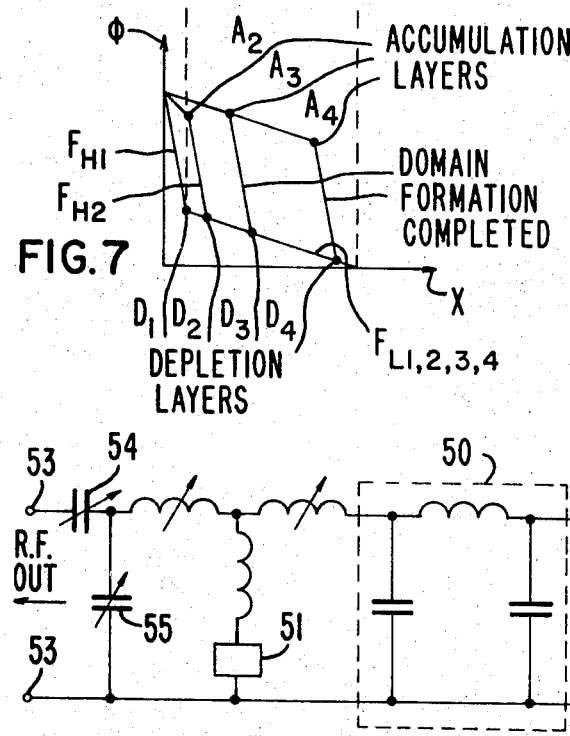
FIG. 7
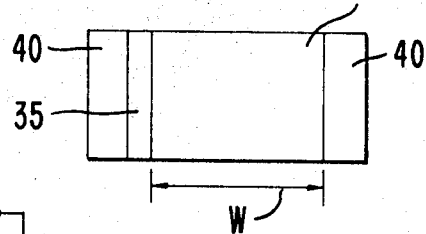
FIG. 9
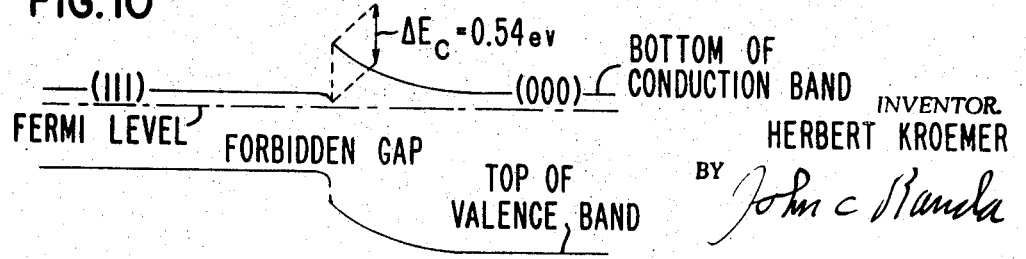
FIG. 10
INVENTOR.
HERBERT KROEMER
BY John C. Banda

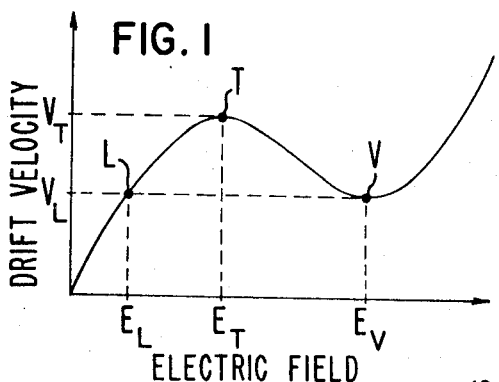
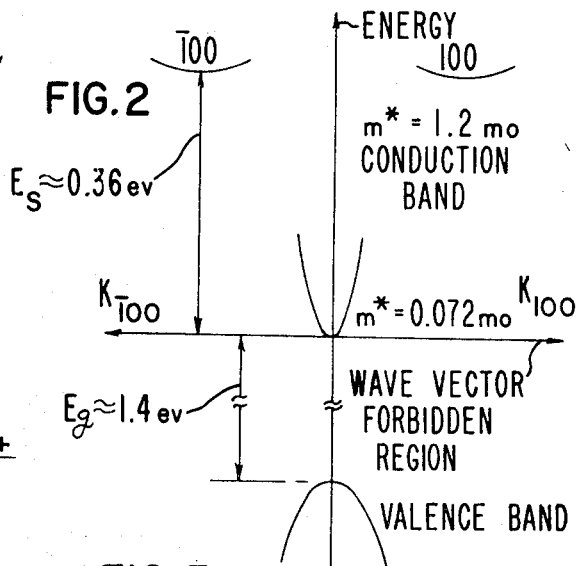
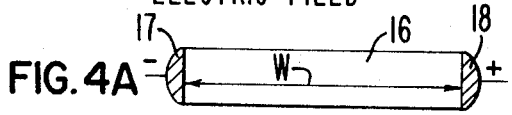
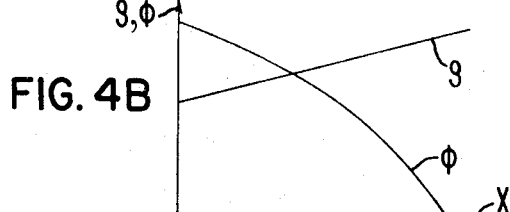
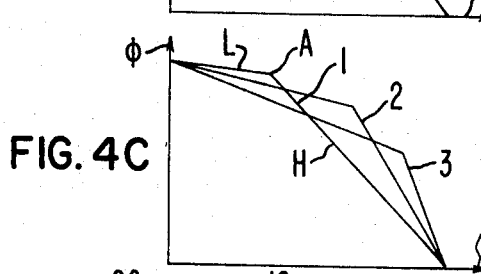
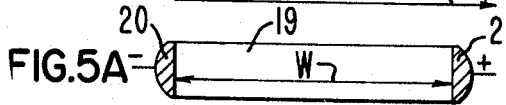
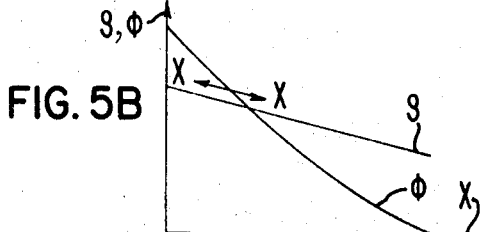
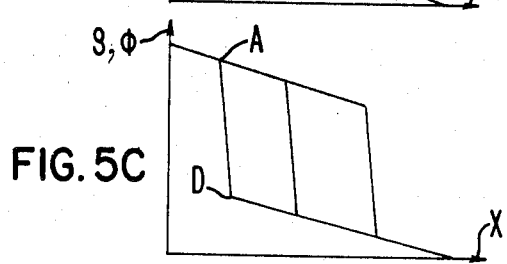
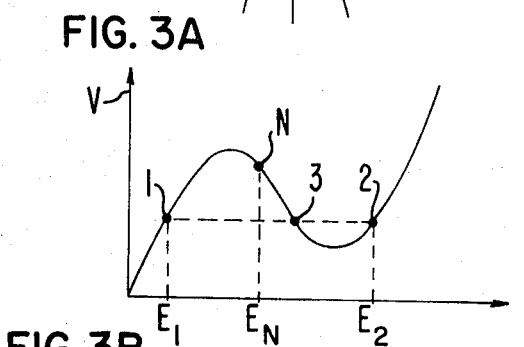
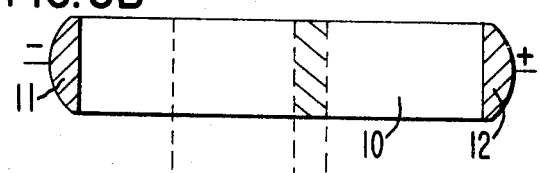
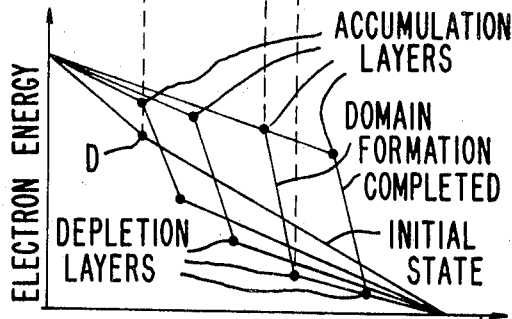

United States Patent Office 3,467,896
Patented Sept. 16, 1969

3,467,896
HETEROJUNCTIONS AND DOMAIN CONTROL IN BULK NEGATIVE CONDUCTIVITY SEMICONDUCTORS
Herbert Kroemer, Sunnyvale, Calif., assignor to Varian Associates, Palo Alto, Calif., a corporation of California
Filed Mar. 28, 1966, Ser. No. 538,092
Int. Cl. H01l 3/00, 5/00
U.S. Cl. 317—234         7 Claims

ABSTRACT OF THE DISCLOSURE

A means for controlling the oscillation mode in bulk negative conductivity semiconductor oscillators. By doping the semiconductor so that a resistivity gradient exists between the positive and negative electrodes with a higher resistivity at the positive electrode, the oscillator can be made to reliably function in the pure accumulation mode. If the resistivity gradient is in the opposite direction, operation will be in the dipole space charge mode. Alternatively the operating mode can be controlled by utilizing a negative electrode formed of a semiconductor material having a higher resistivity than the semiconductor material of the main body and having a positive mobility over the operating range of the oscillator device.

---

This invention relates in general to microwave oscillators utilizing semiconductors which exhibit bulk negative conductivity and more particularly to the use of resistivity gradients and heterojunction electrodes in bulk negative conductivity semiconductors for the purpose of mode control.

The phenomena of bulk negative conductivity (BNC) in semiconductors having a particular type of band structure which results in the semiconductor having a drift velocity $v$ vs. electric field $E$ dependence which contains a region of negative differential mobility $\mu = dv/dE < 0$ or a bulk negative conductivity has finally been achieved. The utilization of BNC semiconductors as oscillators, frequency generators at microwave frequencies up to 100 and perhaps 1000 gc., which is an ultimate limit, is clearly forseeable. The present invention is concerned with basic improvements in such BNC semiconductors with a resultant improvement in efficiency and spectral purity of the microwave oscillations generated by a BNC semiconductor.

The following background information should help in clarifying the terminology involved in the phenomena of a BNC semiconductor and lead to a better understanding of the basic improvements taught by the present invention.

An illustrative graphical portrayal of a typical BNC semiconductor drift velocity $v$ vs. applied electric field $E$ dependence containing a region of bulk negative differential conductivity is shown in FIG. 1. The region between T and V where $\mu = dv/dE < 0$ where $\mu$=electron mobility typifies a BNC semiconductor. The negative differential mobility region occurs at applied electric fields above $E_T$ and extends to $E_V$. The exact values of $E_T$ and $E_V$ will of course depend on the particular BNC semiconductor under consideration.

The rationale for the negative differential mobility region of the FIG. 1 plot can be seen from an examination of the generic energy band diagram of FIG. 2. This K-space diagram is particularly directed to n-type GaAs but is representative of the generic class of semiconductors falling within the teachings of the present invention. In brief, the conduction band structure of a BNC semiconductor will be a many valley type characterized in the following manner:

The semiconductor will be an n-type semiconductor body having a conduction band structure characterized by having satellite valleys which lie energetically higher than a central main valley, with the satellite valleys further characterized by a lower mobility (higher effective mass) than the mobility (lower effective mass) associated with the central main valley, and wherein the energy differential between the bottom of the satellite valleys and the bottom of the central main valley portions of the conduction band is smaller than the energy differential between the top of the valence band and the bottom of the central main valley of the conduction band and wherein the energy differential between the bottom of the satellite valleys and the bottom of the central main valley portion of the conduction band is greater than $2kT$ at the operating temperature where $k$=Boltzmann's constant and $T$=absolute temperature in degrees Kelvin of the semiconductor body or crystal temperature at the operating temperature.

It is to be noted that the generic band structure is obviously not to be restricted to any particular crystallographic axis such as the (100) axis which was chosen only to illustrate a particular example of the general case.

This type of semiconductor will, upon application of a D.C. bias voltage such that $V/w > E_T$ for any portion of the body where $V$=bias voltage
$w$=semiconductor body width between source and drain electrodes and
$E_T$=threshold field;

generate traveling space charge domains which originate at the negative or source electrode and exit at the drain electrode. The exact natural frequency of any given BNC semiconductor will of course vary with the bias, load, material, etc., parameters. The generation of traveling space charge domains can be shown to occur for BNC semiconductor diodes characterized by the following relationship:

$$nw \gtrsim 10^{12}/\text{cm.}^2$$

where $n$=conduction electron number density and $w$=semiconductor body width or thickness in cm. between source and drain electrodes.

The generated frequency will in any case be approximately $f \approx 10^7/w$ in Hz. or cycles/sec. with an upper limit around $v_T/w$ and a lower limit around $v_L/w$ at fields above $E_T$.

The spectral purity, coherence etc. of any given BNC semiconductor oscillator is dependent upon the particular type of traveling space charge domain being generated and the initial starting conditions. The observed rather erratic performance of BNC semiconductors with regard to poor coherence and spectral purity is fundamentally due to microscopic spatial fluctuations in the impurity distribution of the donor ions which results in instabilities in the nature of the initial starting conditions of the traveling space charge domains. By the utilization of resistivity gradients in the main body of the semiconductor between the source and drain electrodes it is possible not only to better control the point of origin of a given space charge domain but also to predetermine the particular type of domain which will be propagated. The resistivity gradients can be positive or negative between the source and drain electrodes and the particular shapes are preferably linear although stepped, non-linear and curved gradients would suffice.

By introducing a positive resistivity gradient between the source and drain electrodes of a BNC semiconductor, higher resistivities at positive or drain electrode, the curve of potential energy of the conduction electrons $\phi$ along the direction of applied field, just prior to the onset of oscillations will be convex upward. When the applied voltage is increased beyond threshold such that $V/w > E_T$ the convex shape of the potential energy distribution of the conduction electrons between source and drain electrodes will cause a pure accumulation mode to form.

A pure accumulation mode will then be propagated as a traveling space charge domain towards the exit region or drain eletrode. The accumulation mode will be characterized by the presence of an accumulation layer bounded on the upstream side by a low field region and bounded on the downstream side by a high field region. The accumulation layer itself is a narrow region of excess or negative space charge populated by electrons of both high and low mobilities as referenced to the generic many valley conduction band structure depicted in FIG. 2.

By introducing a negative resistivity gradient between the source and drain electrodes of a BNC semiconductor, lower resistivities at positive or drain electrode, the curve of the potential energy of the conduction electrons $\phi$ along the direction of applied field, just prior to the onset of oscillations will be concave upward. When the applied voltage is increased beyond threshold such that $V/w > E_T$ the concave shape of the potential energy distribution of the conduction electrons between source and drain electrodes will cause a depletion layer to form in addition to the accumulation layer formed by the negative electrode itself.

A dipole space charge mode will then be propagated as a traveling space charge domain toward the exit region or drain electrode. The dipole space charge mode will be characterized by the presence of a pair of low field regions bounding an upstream accumulation layer separated from a downstream depletion layer by a high field region. The accumulation layer is the same as in the pure accumulation mode case and the depletion layer is a region of positive space charge characterized by the absence of conduction electrons. The high and low field regions will have values dependent on the particular semiconductor material.

The design criterion for the resistivity gradients (in both the positive and negative cases) is the limitation of the gradient to values which are no stronger than is necessary to just override the random nucleation processes in order to assure that all portions of diode main body width $w$ do indeed oscillate. Good results can be obtained using resistivity gradients between 1% and 20% of the average resistivity.

Furthermore, in the case of the negative gradient, the region of high resistivity can be concentrated in the area near the source electrode.

I have also determined that the spectral purity, stability and coherency of BNC diodes can be improved by utilizing a heterojunction source electrode in conjunction with a BNC diode body with the heterojunction electrode (a heterojunction being a junction between two dissimilar semiconductors as opposed to a homojunction which is a union of similar semiconductors) being characterized as follows: (a) higher resistivity than the BNC diode body portion; and (b) not exhibiting a negative mobility at the fields reached during oscillation of the oscillating semiconductor.

In other words, the source electrode making contact to the BNC semiconductor body is not a simple metal contact or a more heavily doped or degenerate region of the same semiconductor. In other words, by selecting the source electrode parameters such as indicated above, it is possible to control the original nucleation point of each dipole domain as well as the initial starting conditions for dipole domain formation in a manner which results in a depletion layer being nucleated directly at the heterojunction interface and developing into a mature dipole domain from this point rather than being left to chance as heretofore occurred. The rationale for the previous instabilities in dipole domain formation and operating frequency were due, in my opinion reached through theoretical analysis, to microscopic spatial fluctuations of the donor distribution in n-type BNC semiconductors which result in a high degree of uncertainty as to what the initial starting conditions and starting point of any given dipole domain will be. By restricting the inital starting condition of each dipole domain to the formation of a depletion layer with the starting point located at the heterojunction interface good improvement in the stability and coherence of the operating frequency will result.

Other types of heterojunction source electrodes which are taught by the present invention are the simple narrow to wide gap case wherein a particularly useful case involves nGe-nGaAs wherein the depletion layer, positive space charge region, created by the $\Delta\epsilon_c$ is useful for forming an initial high field region. The use of a wide to narrow gap heterojunction such as nGaP-nGaAs is taught by the present invention as a technique for obtaining direct injection of electrons from the GaP into the satellite (100) valleys of the nGaAs. A particularly useful junction called the CHI-junction ($\chi$-junction) is also taught by the present invention for obtaining direct electron injection into the satellite valleys of the BNC semiconducor. This $\chi$-type of heterojunction has other uses as will be developed hereinafter.

It is therefore an object of the present invention to provide a novel bulk negative conductivity semiconductor.

A feature of the present invention is the provision of a BNC semiconductor with mode control means.

Another feature of the present invention is the provision of a BNC semiconductor with a positive resistivity gradient for controlling the nucleation of a traveling pure accumulation mode.

Another feature of the present invention is the provision of a BNC semiconductor with a negative resistivity gradient for controlling the nucleation of a traveling dipole space charge mode of propagation.

Another feature of the present invention is the provision of a BNC semiconductor with a heterojunction source electrode for nucleation and mode control.

Another feature of the present invention is the provision of a novel $\chi$-junction type of heterojunction.

Another feature of the present invention is the provision of a narrow to wide forbidden band gap heterojunction control electrode for BNC semiconductors.

Another feature of the present invention is the provision of a wide to narrow forbidden band gap heterojunction source control electrode for BNC semiconductors which can produce direct electron injection into the satellite valleys of the BNC semiconductor.

These and other features and advantages of the present invention will become more apparent upon a perusal of the following specification taken in conjunction with the accompanying drawings wherein:

FIG. 1 is an illustrative graphical portrayal of the drift velocity $v$ vs. applied electrical field E dependence of a BNC semiconductor having a region of negative differential mobility.

FIG. 2 is an illustrative K-space diagram of the generic band structure associated with a BNC semiconductor particularly directed to n-type GaAs.

FIGS. 3A, 3B, and 3C depict the formation of a dipole space charge mode in a BNC semiconductor without a resistivity gradient.

FIGS. 4A, 4B, and 4C depict the formation of a traveling pure accumulation mode in a BNC semiconductor having a positive resistivity gradient.

FIGS. 5A, 5B, and 5C depict the formation of a traveling dipole space charge mode in a BNC semiconductor having a negative resistivity gradient.

FIG. 6 is a cross-sectional view of a typical BNC semiconductor incorporating a heterojunction source electrode for mode control.

FIG. 7 is an illustrative graphical portrayal of controlled formation of a traveling dipole space charge domain type of mode in a BNC semiconductor incorporating a heterojunction control electrode.

FIGS. 8A, 8B, and 8C depict BNC diodes with heterojunction source control electrodes and additional auxiliary electrodes.

FIG. 9 illustrates a typical schematic circuit for a BNC semiconductor oscillator.

FIG. 10 depicts an illustrative portrayal of a nGe-nGaAs heterojunction source control electrode and simple energy band diagram.

Figure 11:
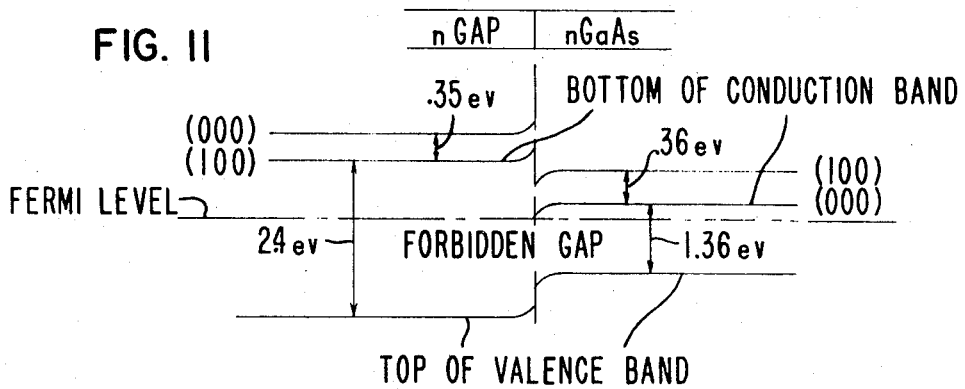

FIG. 11 depicts an illustrative direct injection heterojunction source control electrode and BNC semiconductor.

Figure 12A:
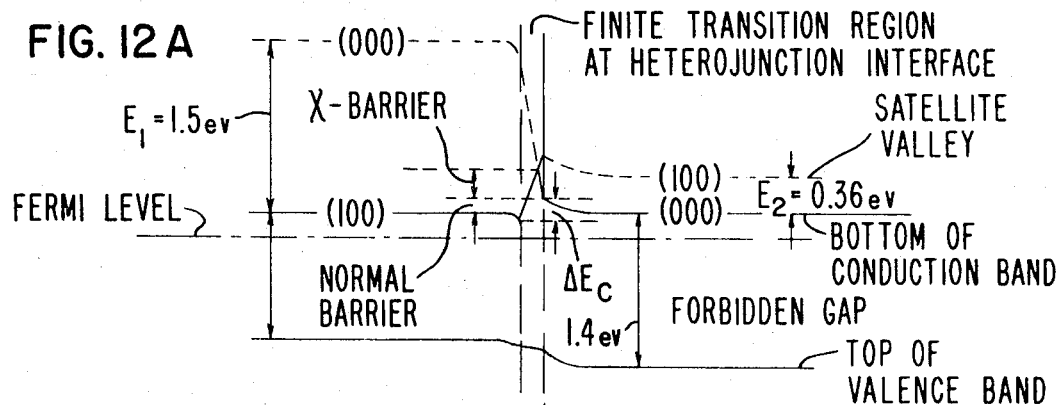
Figure 12B:
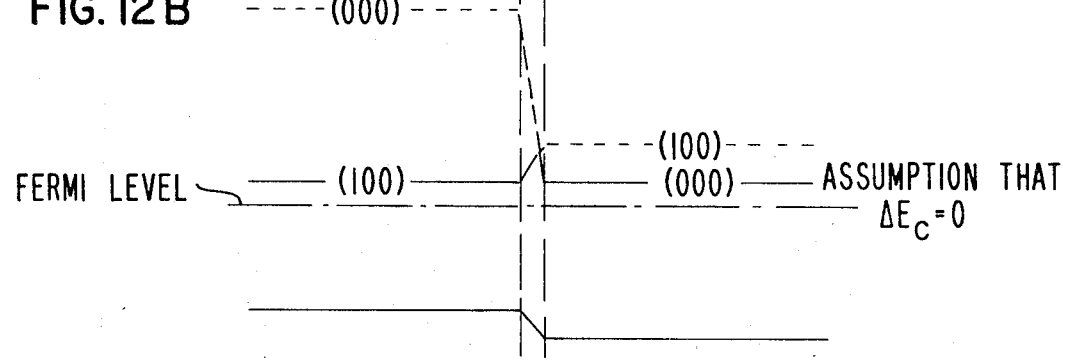

FIGS. 12A and 12B depict a $\chi$-junction for the case of nSi on nGaAs.

Figure 13:
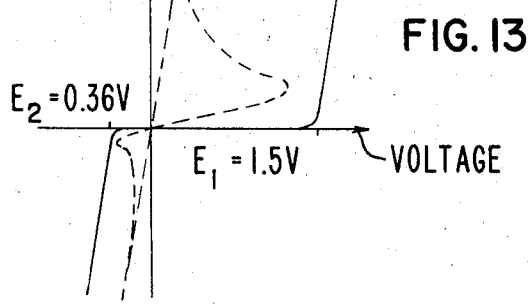

FIG. 13 depicts an illustrative graphical portrayal of the conceptual characteristics of a Si-GaAs $\chi$-junction.

Turning now to FIG. 1 which shows the $v$ vs. E dependence for a BNC semiconductor, it is important to realize that the incidence of oscillations will occur as stated previously for field values $>E_T$.

The precise frequency of oscillation and drift velocity for any given type of mode will vary somewhat. For the pure accumulation type of mode the expected natural frequency would be around $v_T/w$ and for the fully formed dipole mode, if allowed to fully develop into a stable state, the expected natural frequency would be around $v_V/w$. Of course, intermediate values are representative of intermediate stages.

The mechanism responsible for the generation of traveling space charge modes of propagation in BNC semiconductors is found in the band structure depicted in FIG. 2. The particular conduction band structure illustrated in FIG. 2 is directed to n-type GaAs which has been shown to fall within the generic classification set forth in the introductory remarks.

A few of the many semiconductors which exhibit this type of band structure are the following: n-type GaAs; n-type InP; n-type Cdte; n-type $Ga(As_{(1-x)}P_{(x)})$; with x $<0.40$.

Dopants can be selected from 6th column elements and such other well known dopants as Si, Ge, Sn for III–V semiconductors and e.g. Al for n-type CdTe.

The condition for oscillation in a traveling space charge mode regardless of type in BNC semiconductors can be expressed in a more simple manner as follows:

$$n_0w > 10^{12}/cm.^2$$

for thermal reasons the upper limit will be $$n_0w < 10^{15}/cm.^2$$

where:
$n_0$=conduction or carrier electron number density without bias at the operating temperature
$w$=main body width in cm. between source and drain electrodes.

The chosen doping level will, of course, vary depending on the $w$ level. The following design criteria are set forth to illustrate the respective variations in $n_0$ and $w$ within the critical limits.

$$n_0w > 10^{12}/cm.^2$$

$$w \approx 10^7/f$$

where $f$=frequency in cycles/sec.

$$\therefore n_0 > 10^5 \times f$$

The band structure depicted in FIG. 2 GaAs is for the (100)-direction, that is, the energy $\epsilon$ of electrons as a function of their wave vector, $\vec{K}$, for $\vec{K}$-vectors that lie in that crystallographic direction. The $\vec{K}$-vector is the propagation vector of the De Broglie-Wave for that electron. The following relationships exist between the energy, $\epsilon(\vec{K})$ of an electron, its velocity $\vec{V}$, its effective mass tensor $||1/m||$ and an applied field, $\vec{F}$ ($\hbar$ is Planck's constant, divided by $2\pi$; $i$ and $j$ run over $x, y$ and $z$):

$$V_i = \frac{1}{\hbar}\frac{\partial \epsilon}{\partial K_i}$$

$$\left\|\frac{1}{m}\right\|_{ij} = \frac{1}{\hbar^2}\frac{\partial^2 \epsilon}{\partial K_i \partial K_j}$$

$$\frac{\partial \vec{K}}{\partial t} = -\frac{1}{\hbar}q\vec{F}$$

$$\frac{\partial \vec{V}}{\partial t} = -\left\|\frac{1}{m}\right\|q\vec{F}$$

This band structure (n-type GaAs) is characterized by a "central valley" of very low effective mass, of about 0.07 $m_0$ accompanied by a set of "satellite valleys" along the (100)-directions, about 0.36 ev. above the central valley, and with a substantially higher effective mass the exact value of which is somewhat uncertain but which need not concern us here.

At room temperature and for low electric fields almost all the electrons are near the bottom of the central valley. Because of their low effective mass, they have the well-known high electron mobility of GaAs of over 5000 cm.$^2$/volt-sec. But this high mobility also makes it rather easy for a sufficiently strong electric field to accelerate the electrons, that is, to heat them up, to rather high energies of the order of the satellite valley energy. As this happens, the electrons can scatter into the satellite valleys where they have a much higher effective mass and thus a much lower mobility, and where they can contribute much less to the current. If this inter-valley transfer would take place only very gradually with increasing field it would merely lead to a slow decrease of the conductivity, but the overall current would keep rising with increasing field, albeit non-linearly. But as it happens, the transfer sets in rather abruptly with increasing field, and the current decrease due to electron transfer into the low-mobility satellite valleys is stronger than the current increase due to the velocity increase of those electrons that remain in the high-mobility central valley. As a result, the overall current drops and the crystal exhibits a bulk negative differential conductivity. When most of the electrons have been transferred into the satellite valleys, the current will rise again, as shown at the top of FIG. 3. But the crystal will now have a much higher resistivity, due to the much lower electron mobility in the satellite valleys. This negative differential conductivity leads to current oscillations as shown in FIG. 3. Assume that a semiconductor exhibiting a negative differential conductivity is biased with a field that lies inside the negative mobility range, say at N, and assume that this internal field is initially homogeneous. This situation is unstable. Any spatial charge or field fluctuation whatsoever, such as at D in FIG. 3, will not decay as in a medium of positive conductivity but will build up further. In the case shown in FIG. 3 this happens as follows. The field upstream of D is higher than the field downstream. Because of the negative mobility this leads to a lower electron drift velocity (and a lower current) upstream than downstream. As a result there is a net removal of electrons from around D, increasing the already existing positive space charge and the field discontinuity there. Ultimately the entire crystal will break up—electrically—into alternating "domains" of fields $E_1$ below and $E_2$ above the negative mobility range, corresponding to the same current density. The initial fluctuation at D builds up into an electron depletion layer, the accumulation layer or region of negative space charge is nucleated similarly by the opposite field discontinuity at the negative electrode itself. Since these domains consist of mobile electrons they will move along with the electrons from the negative to the positive electrode. Ultimately the high field domain will disappear into the positive electrode. As this happens, the field $E_1$ in the low field domain, and therefore the current through the diode, will increase again towards their threshold values. As these threshold values are reached, a new high field domain will get nucleated near the negative electrode, and the current will decrease again. In this way periodic current oscillations and periodically propagating space charge domains are generated.

The present invention teaches how to predictably predetermine the type of traveling space charge mode to be propagated as well as to better control the nucleation of the mode with a resultant improvement in coherency and spectral purity.

Examination of FIG. 3 discussed above shows a typical example of a BNC semiconductor 10 disposed between a pair of source and drain electrodes 11, 12 biased as indicated. The problem to be solved is the starting conditions. In the example depicted in FIG. 3, we see the starting condition for this particular example to have its origin in the nucleation of a depletion layer at D with a resultant breakup into a dipole mode. This is fine and would result in good stability if identically repeated for each cycle. Unfortunately, this has not proven to be the case for BNC semiconductors heretofore. It is found that instead of the nucleation of an electron depletion layer at D it could just as easily have been nucleated at some other place besides D. Furthermore, in either case, the origin can vary for each cycle. Obviously, this results in poor stability, incoherency, etc.

I have demonstrated through theoretical analysis that the erratic formative conditions heretofore encountered in BNC semiconductors are due fundamentally to statistical fluctuations in the impurity distribution of the donor atoms and have concluded that these uncontrolled microscopic inhomogeneities can be over-ridden, that is, removed as the dominant controlling factor, by introducing controlled macroscopic inhomogeneities in the form of resistivity gradients or steps with a resultant better control of both origin of and type of initial starting conditions as well as ultimate form of traveling space charge mode.

In FIGS. 4A, 4B, 4C, a BNC semiconductor with a positive resistivity gradient is depicted together with the resultant electron formation conditions prior to oscillation and during formation of the mode. The BNC semiconductor 16 is disposed between a pair of source and drain electrodes 17, 18 biased as indicated for oscillation. A positive resistivity gradient $\rho$ introduced e.g. by variable doping epitaxial growth, zone refining gradient freezing processes will produce a convex upward electron potential $\phi$ under bias conditions just under $E_T$ or threshold field as indicated in FIG. 4B. This type of an electron potential profile will result in the nucleation of an electron accumulation layer at A and the propagation of a traveling space charge pure accumulation mode which will develop as indicated by time sequences 1, 2, 3. The starting conditions will be predictable because of the presence of the gradient which will also prevent breakup of the mode into the dipole form. The pure accumulation mode is characterized in its fully formed state by an accumulation layer A, negative space charge region populated by low and high mobility electrons associated with mobility values of central main valley and satellite valleys as stated previously, bounded by an upstream low field region L and a downstream high field region H, the values of which are constantly changing as the pure accumulation mode travels downstream. The drift velocity and current values vary accordingly. Eventually, the field values, current and drift velocity, should stabilize at a fixed value even for this mode assuming that $n$ is large enough to accommodate the necessary amount of space charge during the transit time of the mode.

In FIGS. 5A, 5B, 5C, a BNC semiconductor 19 disposed between a pair of source and drain electrodes 20, 21 biased for oscillation as shown is depicted. The negative resistivity gradient can be introduced by conventional variable doping epitaxial growth processes to produce a concave upward prethreshold electron potential energy profile $\phi$ as shown in 5B. When the voltage is raised above threshold, a depletion layer D will form in addition to the accumulation layer A formed by the negative electrode itself. In other words, a practically speaking fully formed traveling space charge dipole mode is generated directly and in a controlled manner to produce a larger oscillation amplitude than simple erratic formative conditions. Once the dipole mode is generated, the necessity of the negative gradient is removed which means that the negative gradient may be restricted to regions near the source electrode rather than extending completely across $w$. For example, the gradient could be restricted to portion bounded by $x \leftrightarrow x$ as shown in 5B and improved dipole mode generation would still result.

Typical examples of BNC semiconductors with resistivity gradients for nucleation and mode control and illustrative methods of making same are as follows: n-type Ga-As; n-type In-P; n-type Cd-Te; n-type $Ga(As_{(1-x)}P_{(x)})$; with $x < 0.40$.

For methods of preparing the above listed pure and doped semiconductors see by way of example: For $Ga(As_{(1-x)}P_{(x)})$ "Epitaxial Vapor Growth of III–V Compounds" by J. F. Gibbons and P. C. Prehn, October 1963, Technical Documentary Report No. RTD–TDR–63–4238 Technical Report No. 4711–1 Prepared Under AF33(616)–7726 at Stanford Electronics Laboratory; for InP see "Preparation of Crystals of InAs, InP, GaAs and GaP by a Vapor Phase Reaction," J. Electrochemical Soc., vol. 106, No. 6, 509 (1959); for GaAs see "Epitaxial Growth of Doped and Pure GaAs in an Open Flow System" by D. Effer, J. Electrochemical Soc., vol. 112, No. 10, 1020 (1965); for CdTe see "The Growth of Wurtzite CdTe and Sphalerite Type CdS Single Crystal Films" by Martin Weinstein, G. A. Wolff and B. N. Das. Applied Phys. Letters, vol. 6, No. 4, 1965. Variation of the constituent parameters during growth will allow the chosen resistivity gradients to be built in to the desired level for a given case.

Since the prior art is replete with various methods of introducing resistivity gradients in compound semiconductors of the types which will exhibit a negative differential mobility only a few representative illustrations will be given. For example, gradient freezing, zone refining and doped epitaxial growth techniques are well established in the art. Resistivity gradients for N-InP can be made by gradient freezing using the approach of Lawson, W. D., and S. Nielson (1958) "Preparation of Single Crystals," Butterworth Publications, London, page 17 . . .; resistivity gradients in N-GaAs can be introduced by zone refining using the techniques of Weisberg, L. R., F. D. Rosi, P. G. Herkart (1959) "Properties of Elemental and Compound Semiconductors," Interscience, New York, page 371 . . .; Resistivity gradients for N-CdTe can be made by gradient freezing using the techniques of Lawson, W. D., S. Nielson, E. H. Putley, A. S. Young (1959), "Preparation and Properties of HgTe and Mixed Crystals of HgTe-CdTe," J. Phys. Chem. Solids, vol. 9, pages 325 . . .; resistivity gradients in n-$Ga(As_{(1-x)}P_{(x)})$ with ($x < 0.40$) can be made by the doped epitaxial growth technique found in Quarterly Research Review No. 12 (Jan.–Mar. 31, 1965, Stanford Electronics Laboratories, p. II 47 . . . by G. Pearson), J. W. Allen, D. H. Loescher, entitled "Doped Epitaxial Growth of Sulfur Doped $Ga(As_{(1-x)}P_{(x)})$."

Turning now to FIG. 6 there is depicted another mode control approach of the present invention usable in conjunction with a BNC semiconductor. The starting conditions can be controlled as to the initial formation of a depletion layer at the source electrode by incorporating a heterojunction source electrode as depicted in FIG. 6 with the resultant formation of a traveling space charge dipole domain type of mode as depicted in FIG. 7.

The BNC semiconductor main body 30 depicted in FIG. 6 has a width $w$ disposed between a pair of source and drain electrodes with a pair of leads 33, 34 if desired.

The source electrode in the case of n-type BNC diodes is the origin of the traveling space charge instability and the drain electrode is the exit for the traveling space charge instability. According to the further teachings of this invention by making the source electrode 31 include a heterojunction electrode 35 with the following characteristics, (a) Higher resistivity than the oscillating body portion $w$
(b) Not exhibiting a negative conductivity at the electric fields reached during oscillation of the oscillating semiconductor, improved frequency stability will result. The remaining portion, if any, of the source electrode can be a simple alloyed metal contact 36 such as tin or any other high conductivity contact electrode such as a heavily doped (degenerate) n+ semiconductor of the same material to facilitate integration into integrated circuits. The drain electrode 32 is also preferably a high conductivity type of electrode such as for example, an ohmic metal electrode of tin. Alternatively, as mentioned above for facilitation of incorporation of the BNC semiconductors of the present invention in integrated circuit environments the metal electrode portions 36, 32 can be replaced with epitaxially grown layers of the same semiconductor as they are grown on only more heavily doped such that $n_c w > nw$ where $n_c$ in this case is the electron conduction or carrier number density of the n-type semiconductor electrode portions 36, 32. In other words, the important aspect of this type of mode control is the utilization of a heterojunction source electrode 35. If desired, the heterojunction source electrode 35 can include a metal, or n+ (degenerate) portion or metal pressure contact or other type of high conductivity electrode.

With the above indicated type of hetrojunction source electrode incorporated in a BNC semiconductor oscillator controlled dipole domain formation will result as indicated in FIG. 7. Initially, a depletion layer D will be nucleated directly at the heterojunction interface 38 bounded on the upstream side by a high field region $F_{H1}$ and on the downstream side by a low field region $F_{L1}$. This space charge instability will commence propagation toward the drain electrode and will, practically speaking, immediately begin breakup of the high field region to cause nucleation of an accumulation layer $A_2$ upstream from the depletion layer at the next illustrative time interval represented by depletion layer $D_2$. From this point on the dipole domain continues development into its fully mature form such as indicated at time interval 3, and ultimately propagates out the drain electrode at which point the cycle will repeat itself ad infinitum under stable bias and load conditions with $f \approx v_L / w$.

A suitable material for the hetrojunction control electrode 35 will obey the aforementioned criteria of:

$$\rho_h > \rho_B$$

where:

$\rho_h$ = resistivity of the heterojunction control electrode,
$\rho_B$ = resistivity of the BNC semiconductor body and $\sigma_h$ is positive over the operating range of the device where
$\sigma_h$ = conductivity of the heterojunction control electrode.

Suitable relative ratios between $\rho_h$ and $\rho_B$ are that $\rho_h$ exceed $\rho_B$ by 10% or more as computed at the operating temperature and zero bias.

The techniques for measuring conductivity and resistivity are well known in the art. For example, see an article by L. J. Van der Pauw, "A Method of Measuring Specific Resistivity and Hall Effect of Discs of Arbitrary Shape," Philips Research Reports, vol. 13, p. 1 (1958).

A few specific examples of suitable heterojunction control electrode semiconductors utilizable in conjunction with a BNC body made of n-type GaAs are as follows:

n-GaP
n-GaAs-GaP mixture with more than 50% GaP $$Ga(As_{(1-x)} - P_{(x)})$$

with $x > .5$
n-Ge and any other semiconductors not exhibiting a negative conductivity.

The thickness dimension $t$ of the heterojunction control electrode will be less than $w$ (preferably as thin as feasible) to facilitate formation of the high field region in a short time span for efficiency considerations. A typical illustrative example is 1 micron.

As mentioned previously, other types of BNC semiconductors are known beside n-type GaAs such as listed in the introduction. In each case the heterojunction control electrode material is easily selected from any known semiconductors with the restriction that $\rho_h > \rho_B$ and $\sigma_h$ be positive.

Good practice would be to select III-V semiconductors as heterojunction control electrodes when the BNC main body is a III-V compound and II-VI semiconductors as heterojunction control electrodes when the BNC main body is a II-VI semiconductor. Ge can be used with both III-V main body semiconductors and II-VI main body semiconductors. The heterojunction control electrodes are preferably epitaxially deposited in manners well known in the art.

The following articles are cited to provide representative techniques for building heterojunction control electrodes having the above set forth properties.

The deposition of n-Ge on -nGaAs is taught in an article by J. C. Marinace "Tunnel Diodes by Vapor Growth of Ge on Ge and on GaAs," IBM Journal of Res. and Dev., Vol. 4, No. 3, July 1960. The deposition of n-Ge on n-InP is set forth in an article entitled "Growth of Germanium Epitaxial Layers by the Pyrolysis of Germane" RCA Review, December 1963, No. 4, p. 499. This deposition technique can also be used for the deposition of n-Ge on n-CdTe and n-Ga(As$_{(1-x)}$P$_{(x)}$) with $x < 0.40$. The deposition of n-GaP on n-GaAs and n-Ga(As$_{(1-x)}$P$_{(x)}$) with $x > .5$ on n-GaAs is taught in NASA Research Grant No. NSG-555 Tech. Report No. 5108–1 by Yen-sun Chen, October 1965.

As discussed previously, the heterojunction control electrode will of necessity be the source electrode for mode control. The source electrode can also include a high conductivity portion such as alloyed tin portion 36 metal pressure contact or n+ similar semiconductor as illustrated in FIGS. 8A, 8B, and 8C. The drain electrode will preferably be similar. In FIG. 8A the BNC diode with heterojunction control electrode is the same as in FIG. 6.

In FIG. 8B the tin electrode portions are replaced with metal pressure contacts 39 and in FIG. 8C the n+ electrode scheme is used.

In FIG. 9 a typical schematic circuit of a microwave generator employing the bulk negative conductivity semiconductor with built in mode control means as the active element is depicted. The circuit includes a low pass filter section 50, active element 51, bias source means 52 and output terminals 53 for extracting the microwave energy. The circuit includes series and shunt capacitors 54, 55 for varying the coupling to the load and blocking the bias voltage from the load and for tuning the operating frequency of the generator. The particular oscillator depicted in FIG. 9 is merely an illustrative example of one of many possible forms which can be implemented by suitable microwave circuitry. For example, see an article by P. N. Robson and S. M. Mahrous in The Radio and Electronic Engineer, December 1965, pages 345–352, for a typical coaxial version of a microwave oscillator using the internal oscillations generated in a bulk negative conductivity semiconductor body forming the active circuit element. The bias source means can take any suitable form such as for example a battery, pulsed source.

In FIG. 10 an illustrative example of an nGe-nGaAs heterojunction control electrode energy band diagram is depicted for illustrative purposes. The energy band diagram shown in FIG. 10 is for equilibrium conditions (no bias) and depicts only the bottom of the conduction band and the top of the valence band. See R. L. Anderson, "Germanium-Gallium Arsenide Heterojunctions," IBM J. Res. Develop., vol. 4, pp. 283–287, July 1960 for further elucidation. The usefulness of this type of conduction band discontinuity between the main body, whatever it may be and the source electrode (the source electrode is the Ge) by means of a narrow to wide gap heterojunction approach (n-Ge to n-GaAs) is twofold. In one case previously discussed, a high field is treated at the interface between the Ge and GaAs by using Ge or any other n-type of semiconductor which has a lower conductivity than the GaAs. Now in the case of Ge the larger electric field at the interface is contributed to by the $\Delta\epsilon_c$ (band edge discontinuity) and by use of Ge which is doped to have a higher resistivity than the oscillating body as previously discussed. If the Ge was doped such that its resistivity was lower than the resistivity of the oscillating body then the mechanism responsible for the high field region at the interface would be the $\Delta\epsilon_c$. In other words, the heterojunction control electrode for mode control is useful regardless of its resistivity characteristics for the narrow to wide gap case because of the built in $\Delta\epsilon_c$ which in turn produces the depletion layer (or positive space charge region) at the interface junction which as discussed previously is a desirable result for mode control purposes. The use of a n—n heterojunction control electrode eliminates any minority carrier effects.

Once again, as stated previously, improvements in BNC semiconductors which generate traveling space charge instabilities can be achieved if the primary space charge layer can be made a depletion layer. Then the high field upstream domain will in turn result in the nucleation of accumulation layers as secondary space charge layers over a restricted range and well synchronized transversely. The utilization of a nGaP nGaAs heterojunction for mode control can function as a direct injector of electrons from the bottom of the nGaP conduction band (100) into the satellite valleys (100) of the nGaAs since the GaP has forbidden band energy gap of $\approx 2.4$ electron volts while the GaAs has a forbidden energy band gap of 1.35 electron volts. The presence of a built in band edge discontinuity $\Delta\epsilon_c$ between the bottoms of the conduction bands of the GaP and the GaAs and the fact that the (100) satellite valleys in GaAs lie $\approx .36$ ev. above the (000) valleys which is well within the $\Delta\epsilon_c$ level, assuming symmetry will result in the top of the band edge discontinuity lying energetically higher than the satellite valleys of the nGaAs and direct injection of electrons from the (100) band of the nGaP into the satellite (100) valleys (100) nGaAs will occur for applied bias voltages.

The electrons injected into the (100) satellite valleys will scatter into the (000) valley of the n-GaAs but when the oscillator is biased in its negative differential mobility region the usefulness of direct injection into the satellite valleys is apparent in the creation of a high field region at the interface as stated previously. An example of a multiband energy band diagram for nGaP on nGaAs is depicted in FIG. 11 for illustrative purposes at thermal equilibrium. The (111) valleys are not shown for the sake of simplicity.

The nGe on nGaAs and nGaP on nGaAs electrodes are prepared by epitaxial deposition in the same manner as discussed previously.

In FIGS. 12A and 12B a CHI-junction is depicted for the case of nSi on nGaAs. This heterojunction has very unusual properties as will be readily apparent and will also find ready application as a means for direct injection of electrons into the satellite valleys of the nGaAs oscillator. The CHI-junction ($\chi$-junction) is a novel form of heterojunction and will be explained in more detail with reference to FIGS. 12A and 12B. An extremely useful property results in a heterojunction which has subsidiary (satellite) valleys for the narrow gap partner which rise above the band edge discontinuity as in the case for Si-GaAs as shown in FIG. 12A. The (000) valley (a saddle point in this case) in silicon is about 1.5 ev. above the lowest valleys, bottom of conduction band, the (100) valleys. In GaAs the (100) valleys are about 0.36 ev. above the (000) band edge. The (111) valleys do not enter the picture since they are higher than both the Si-(000) valley and the GaAs-(100) valley. The absolute value of the conduction band edge discontinuity $\Delta\epsilon_c$ for this particular case is not known, but its exact value is irrelevant for the argument that follows:

It is seen that a barrier exists at the heterojunction that is larger than the normal conduction band discontinuity $\Delta\epsilon_c$, and as seen in FIG. 12B this barrier would exist even if there were no normal conduction band discontinuity. We will call such a junction a $\chi$-junction since it resembles the Greek letter $\chi$.

If $\Delta\epsilon_c$ is the conduction band discontinuity, $E_1$ and $E_2$ the height of the satellite valleys on the two sides of the junction, then the height of the crossover point of the $\chi$-barrier over the normal barrier is $$E_\chi = E_2 \frac{(E_1 - \Delta\epsilon_c)}{E_1 + E_2}$$

independent of the width of any transition region. For the Si-GaAs case $$E_\chi = 0.29 \text{ ev.}$$

for $\Delta E_c = 0$. In the other extreme, if $\Delta E_c$ were equal to the gap difference of Si and GaAs, $\Delta E_c = 0.28$ ev. and $$E_\chi = 0.24 \text{ ev.}$$

Electrons with an energy above the crossover point of the $\chi$-barrier could, in principle, cross the barrier, if they found a way to change their momentum by the large amount required to jump into an altogether different valley, and under the same conditions electrons might also tunnel through the barrier. If no such momentum change can take place, the electrons will be reflected and the impedance of the junction will be high in either direction, at least until voltages have been reached that are sufficient to overcome the entire height of the $\chi$-barrier, at which point direct injection into the (100) satellite valleys of the nGaAs will take place.

If absolutely no momentum exchange were possible at the junction, and assuming there were no normal conduction band discontinuity $\Delta\epsilon_c = 0$, the current-voltage characteristic of the nSi-nGaAs heterojunction of FIG. 12B would look as the solid line in FIG. 13. The most immediately useful application for this type of heterojunction that would inject heavily into a higher-lying valley, (100) of nGaAs, rather than into the lowest conduction band valley, (000) of GaAs; could again be for the source electrode of a BNC semiconductor as discussed previously. This follows since the bulk negative conductivity of n-GaAs and other types flows from the field-induced transfer of electrons from the (000) central main valley to the high (100) satellite valleys as discussed previously in connection with FIGS. 1 and 2 in particular.

Another interesting conceptual use for a $\chi$-junction would be the following. Since, in reality the momentum exchange at the interface junction will never be completely forbidden any scattering processes, by phonons, impurities, other electrons, or by lattice imperfections (dislocations), may assist such an exchange. As a result, there will always be a finite conductivity before the upper-valley injection sets in. By increasing this finite conductivity externally, e.g. feedback or simply increased current it is conceptually feasible to increase the momentum exchange at the interface for the electrons populating the (100) conduction band bottom of the nSi (low mobility high effective mass) such that they transfer into the (000) main valley of the nGaAs (high mobility-low effective mass) prior to the onset of injection into the higher satellite valleys of the wide gap partner. The result of this process would produce a negative resistance as shown in the dashed line of FIG. 13. Both electron-electron scattering and multiple phonon processes could lead to such a negative resistance at high current values and low voltages. Standard Si technology may be used to prepare the $\chi$-junction in conjunction with the more recently developed epitaxial GaAs techniques. See, by way of example, R. S. Wagner and W. C. Ellis, "Vapor-Liquid-Solid Mechanism of Single Crystal Growth," Appl. Phys. Lett., vol. 4, pp. 89–90, March 1964 and the previously cited article by D. Effer entitled "Epitaxial Growth of Doped and Pure GaAs in an Open Flow System," J. Electrochemical Soc., vol. 112, No. 10, 1020 (1965).

In brief summary then, the present invention teaches several novel ways of obtaining improved control over the traveling space charge instabilities associated with the BNC semiconductor. The techniques include appropriate narrow to wide gap resistivity types; wide to narrow gap for direct injection; $\chi$-junction; and resistivity gradients in bulk material itself.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A semiconductor microwave oscillator device comprising: an active element including a main body of semiconductor material characterized by having a drift velocity vs. electric field dependence with a region of negative differential mobility, said semiconductor main body being disposed between source and drain electrodes, and further characterized by generating internal traveling space charge domains upon being biased in its region of negative differential mobility, said semiconductor device being provided with means for predetermining the type of traveling space charge mode, said means comprising a heterojunction source control electrode, characterized by being made from a semiconductor material having a resistivity $$\rho_h > \rho_B$$

where $\rho_h$ is the resistivity of said heterojunction control electrode material, and $\rho_B$ is the resistivity of said main body semiconductor, said heterojunction control electrode being further characterized by having a positive mobility over the operating range of the device.

2. The semiconductor microwave oscillator defined in claim 1 wherein said heterojunction source electrode is GaP and said semiconductor main body is n-type GaAs.

3. The semiconductor microwave oscillator defined in claim 1 wherein said heterojunction source electrode is Si and said semiconductor main body is n-type GaAs.

4. A semiconductor microwave oscillator device comprising a main body of semiconductor material characterized by having a drift velocity vs. electric field dependence with a region of negative differential mobility, said semiconductor main body being disposed between source and drain electrodes, and further characterized by generating internal traveling space charge domains upon being biased in its region of negative differential mobility, said semiconductor device being provided with means for predetermining the type of traveling space charge mode which will propagate between said source and drain electrodes, said means for predetermining comprising a resistivity gradient in said main body in the direction of electron flow between said source and drain electrodes, said resistivity gradient falling within the range of 1% to 20% of the average resistivity of the main semiconductor body.

5. The device defined in claim 4 wherein said resistivity gradient is positive in the direction of propagation of said traveling space charge mode thereby causing formation of an accumulation mode.

6. The device defined in claim 4 wherein said resistivity gradient is negative in the direction of propagation of said traveling space charge mode thereby causing formation of a dipole mode.

7. A semiconductor microwave oscillator device comprising an active element including a main body of semiconductor material characterized by having a drift velocity vs. electric field dependence with a region of negative differential mobility, said semiconductor main body being disposed between source and drain electrodes, and further characterized by generating internal traveling space charge domains upon being biased in its region of negative differential mobility, said semiconductor device being provided with means for predetermining the type of traveling space charge mode which will propagate, said means for predetermining being a heterojunction source control electrode, said heterojunction source control electrode being an n-type semiconductor having a larger forbidden band gap than the forbidden gap of said body n-type semiconductor material.

References Cited

UNITED STATES PATENTS

| | | | |
|---|---|---|---|
| 2,761,020 | 8/1956 | Shockley | 317—235 |
| 3,209,215 | 9/1965 | Esaki. | |
| 3,262,059 | 7/1966 | Gunn et al. | |
| 3,365,583 | 1/1968 | Gunn. | |

OTHER REFERENCES

Applied Physics Letters, "Microwave Oscillation in GaAs$_x$P$_{1-x}$ Alloys" by Allen et al., pp. 78–80, vol. 7, No. 4, Aug. 15, 1965.

JAMES D. KALLAM, Primary Examiner

J. D. CRAIG, Assistant Examiner

U.S. Cl. X.R.

331—107